(12) United States Patent
Koike et al.

(10) Patent No.: US 12,019,091 B2
(45) Date of Patent: Jun. 25, 2024

(54) AIRFLOW DETECTION APPARATUS, AIRFLOW DETECTION METHOD, AND AIRFLOW DETECTION PROGRAM

(71) Applicant: Taikisha Ltd., Tokyo (JP)

(72) Inventors: Toshihiko Koike, Tokyo (JP); Tomoo Yamashita, Tokyo (JP)

(73) Assignee: Taikisha Ltd., Tokyo (JP)

( * ) Notice: Subject to any disclaimer, the term of this patent is extended or adjusted under 35 U.S.C. 154(b) by 415 days.

(21) Appl. No.: 17/414,609

(22) PCT Filed: Aug. 31, 2020

(86) PCT No.: PCT/JP2020/032903
§ 371 (c)(1),
(2) Date: Jun. 16, 2021

(87) PCT Pub. No.: WO2021/045008
PCT Pub. Date: Mar. 11, 2021

(65) Prior Publication Data
US 2022/0057425 A1     Feb. 24, 2022

(30) Foreign Application Priority Data
Sep. 6, 2019   (JP) ................. 2019-162631

(51) Int. Cl.
  *G01P 13/00*   (2006.01)
  *B05B 12/12*   (2006.01)
  (Continued)

(52) U.S. Cl.
  CPC .......... *G01P 13/0006* (2013.01); *B05B 12/12* (2013.01); *B05B 16/60* (2018.02);
  (Continued)

(58) Field of Classification Search
  CPC ......... G01P 13/0006; G06T 7/90; G06T 7/70; G06T 7/0004; G06T 7/20;
  (Continued)

(56) References Cited

U.S. PATENT DOCUMENTS 7,248,942 B2    7/2007 Bash et al.
7,826,653 B2 *  11/2010 Mori .................. G01P 5/20
                                                          382/218
(Continued)

FOREIGN PATENT DOCUMENTS

CN       1982242 B  *  9/2010 ............... B32B 5/16
CN    109084950 A  *  12/2018
(Continued)

OTHER PUBLICATIONS

Garmat, "Modified Downdraft Spray Booth" (Year: 2016).*

*Primary Examiner* — Dung Hong
(74) *Attorney, Agent, or Firm* — The Webb Law Firm

(57) ABSTRACT

An airflow detection apparatus (1) includes an airflow detection apparatus (1) that detects an airflow in a painting booth, and includes a thread-like member (2) installed inside the painting booth, an image capture device (4) capable of generating image data obtained by capturing an image of the thread-like member (2), and a calculation device capable of performing calculation processing on the image data. The thread-like member (2) is installed in the painting booth in a mode in which at least a portion thereof is suspended. The calculation device specifies a portion corresponding to the thread-like member (2) in the image data, and detects an airflow based on a position of the portion.

12 Claims, 4 Drawing Sheets

(51) Int. Cl.
  *B05B 16/60* (2018.01)
  *G06T 7/00* (2017.01)
  *G06T 7/20* (2017.01)
  *G06T 7/70* (2017.01)
  *G06T 7/90* (2017.01)
  *G06V 20/00* (2022.01)

(52) U.S. Cl.
  CPC .............. *G06T 7/0004* (2013.01); *G06T 7/20* (2013.01); *G06T 7/70* (2017.01); *G06T 7/90* (2017.01); *G06V 20/00* (2022.01); *G06T 2207/30108* (2013.01)

(58) Field of Classification Search
  CPC .......... G06T 2207/30108; B05B 16/60; B05B 12/12; G06V 20/00
  See application file for complete search history.

(56) References Cited

U.S. PATENT DOCUMENTS

2005/0187664 A1* 8/2005 Bash ................ F24F 11/52
  700/276
2014/0244046 A1  8/2014 Zhou et al.

FOREIGN PATENT DOCUMENTS

| CN | 109084950 A | | 12/2018 |
|----|---|---|---|
| CN | 208888272 U | * | 5/2019 |
| CN | 208888272 U | | 5/2019 |
| JP | 5164770 A | | 6/1993 |
| JP | 2002316078 A | * | 10/2002 |
| JP | 2002316078 A | | 10/2002 |

\* cited by examiner

AIRFLOW DETECTION APPARATUS, AIRFLOW DETECTION METHOD, AND AIRFLOW DETECTION PROGRAM

CROSS-REFERENCE TO RELATED APPLICATIONS

This application is the United States national phase of International Application No. PCT/JP2020/032903 filed Aug. 31, 2020, and claims priority to Japanese Patent Application No. 2019-162631 filed Sep. 6, 2019, the disclosures of which are hereby incorporated by reference in their entirety.

BACKGROUND OF THE INVENTION

Field of the Invention

The present invention relates to an airflow detection apparatus, an airflow detection method, and an airflow detection program for detecting an airflow in a painting booth.

Description of Related Art

A process of performing spray painting in a painting booth is widely used to paint an object to be painted, such as an automobile or an electrical appliance. In spray painting, not all of the paint discharged from a spray device, such as a spray-painting device, is adhered to the object to be painted, and thus, excess paint drifts in the painting booth. If the excess paint is adhered to the object to be painted, there is concern that the object to be painted will be contaminated, and it is therefore necessary to remove the excess paint to the outside of the system. For this reason, in the painting booth, a method of forming an airflow from an upper side toward the lower side of the booth and removing the excess paint using this airflow has been conventionally used.

If an airflow in the horizontal direction (horizontal airflow) is present in addition to the airflow from the upper side toward the lower side of the painting booth, there is concern that painting quality will be impaired. Firstly, since the pattern of spray painting changes under the influence of a horizontal airflow, if the horizontal airflow irregularly changes, painting quality may vary between objects that are sequentially painted. Secondly, if a horizontal airflow that enters the painting booth from the outside is present at an entrance of the painting booth, there is concern that dust flows into the painting booth and impair painting quality. Thirdly, in the case where the inside of the painting booth is partitioned into sections for colors to be painted in order to paint an object to be painted in a plurality of colors, if a horizontal airflow that flows over adjacent sections is present, there is concern that a paint used in one section will mix into another section and contaminate the object to be painted in the other section. To eliminate the factor that thus impairs painting quality, air supply and exhaust in the painting booth needs to be controlled such that a horizontal airflow does not occur.

Devices for detecting an airflow in a painting booth have been conventionally proposed in order to enable such control. For example, JP 2002-316078A (Patent Document 1) discloses an airflow detection apparatus that includes a wind receiving plate that is pressed by an airflow to swing, and a detection means for electrically detecting the swing of the wind receiving plate. JP H5-164770A (Patent Document 2) discloses an airflow measuring device that includes an ultrasonic oscillator and a receiver.

Patent Document 1: JP 2002-316078A
Patent Document 2: JP H5-164770A

SUMMARY OF THE INVENTION

However, with the techniques such as those described in Patent Documents 1 and 2, there is concern that an airflow will not be able to be detected when the wind speed of the airflow is extremely low. With the technique described in Patent Document 1, since the wind receiving plate has some weight, it is difficult to detect an airflow that is insufficient to swing the wind receiving plate or an airflow that swings the wind receiving plate only slightly. With the technique described in Patent Document 2 as well, it is difficult to detect a small airflow that is insufficient to cause a difference in transmission time of ultrasonic waves in a forward direction and a reverse direction of an airflow.

For this reason, it is desired that an airflow detection apparatus, an airflow detection method, and an airflow detection program are realized with which an airflow can be favorably detected even if the airflow is small.

A first airflow detection apparatus according to the present invention is an airflow detection apparatus that detects an airflow in a painting booth, and the apparatus includes: a thread-like member installed inside the painting booth; an image capture device capable of generating image data obtained by capturing an image of the thread-like member; and a calculation device capable of performing calculation processing on the image data, wherein the thread-like member is installed in the painting booth in a mode in which at least a portion of the thread-like member is suspended, and the calculation device specifies a portion corresponding to the thread-like member in the image data, and detects the airflow based on a position of the portion.

A first airflow detection method according to the present invention is an airflow detection method for detecting an airflow in a painting booth, and the method includes: a step of generating image data obtained by capturing an image of a thread-like member installed in a mode in which at least a portion of the thread-like member is suspended inside the painting booth; a step of performing calculation processing on the image data using a calculation device, and specifying a portion corresponding to the thread-like member in the image data; and a step of detecting the airflow based on a position of the portion.

A first airflow detection program according to the present invention is an airflow detection program for detecting an airflow in a painting booth that causes a computer to execute: a function of performing calculation processing on image data obtained by capturing an image of a thread-like member installed in a mode in which at least a portion of the thread-like member is suspended inside the painting booth, and specifying a portion corresponding to the thread-like member in the image data; and a function of detecting the airflow based on a position of the portion.

According to the above configuration, an airflow is detected based on a swing of the thread-like member that is lightweight, and it is therefore possible to favorably detect an airflow even if the airflow is small.

A second airflow detection apparatus according to the present invention is an airflow detection apparatus that detects an airflow in a painting booth, and the apparatus includes: a discharge device capable of discharging a fluid upward or downward inside the painting booth; an image capture device capable of generating image data obtained by capturing an image of the fluid; and a calculation device capable of performing calculation processing on the image data, wherein the fluid can be detected by an optical method in at least a portion of an imaging area of the image capture device, and the calculation device specifies a portion corresponding to the fluid in the image data, and detects the airflow based on a position of the portion.

A second airflow detection method according to the present invention is an airflow detection method for detecting an airflow in a painting booth, and the method includes: a step of generating image data obtained by capturing an image of a fluid discharged upward or downward inside the painting booth; a step of performing calculation processing on the image data using a calculation device, and specifying a portion corresponding to the fluid in the image data; and a step of detecting the airflow based on a position of the portion.

A second airflow detection program according to the present invention is an airflow detection program for detecting an airflow in a painting booth that causes a computer to execute: a function of performing calculation processing on image data obtained by capturing an image of a fluid discharged upward or downward inside the painting booth, and specifying a portion corresponding to the fluid in the image data; and a function of detecting the airflow based on a position of the portion.

With the above configuration, an airflow is detected based on movement of the fluid. Since the flowing state of the fluid may be sensitively affected by an airflow in the booth and change, according to this configuration, an airflow can be favorably detected even if the airflow is small.

Preferable modes of the present invention will be described below. However, the scope of the present invention is not limited by the following examples of the preferable modes.

In the airflow detection apparatus according to the present invention, it is preferable as one mode that the painting booth has a see-through portion an inside of which can be seen from an outside thereof, the image capture device is installed outside the painting booth, and the thread-like member and the image capture device are provided at respective positions at which the image capture device can capture an image of the thread-like member through the see-through portion.

According to this configuration, the image capture device is less likely to be stained with a paint. Further, even in the case where a device installed in the painting booth is required to be explosion-proof, an explosion-proof device does not need to be used as the image capture device.

In the airflow detection apparatus according to the present invention, it is preferable as one mode that the calculation device specifies one end portion and another end portion of the portion corresponding to the thread-like member in the image data, and detects the airflow based on an angle formed by a straight line connecting the one end portion and the other end portion and a vertical axis direction of the image data.

According to this configuration, the direction and wind speed of an airflow can be favorably detected.

In the airflow detection apparatus according to the present invention, it is preferable as one mode that the image capture device generates the image data at a predetermined time interval, and the calculation device detects the airflow based on a moving average of the angle with respect to time that is calculated based on the image data generated at the predetermined time interval.

According to this configuration, it is possible to avoid making an inappropriate judgment even if an airflow is irregular.

In the airflow detection apparatus according to the present invention, it is preferable as one mode that the calculation device specifies the portion corresponding to the thread-like member in the image data based on numerical information regarding at least some pixels of the image data.

According to this configuration, the portion corresponding to the thread-like member in the image data can be specified by relatively simple calculation processing.

In the airflow detection apparatus according to the present invention, it is preferable as one mode that the image data includes at least two pieces of numerical information for each pixel, and the calculation device specifies the portion corresponding to the thread-like member in the image data based on a difference between one piece of the numerical information and another piece of the numerical information regarding the at least some pixels of the image data.

According to this configuration, it is possible to improve the accuracy of specifying the portion corresponding to the thread-like member in the image data regardless of the lighting state at the installation location.

In the airflow detection apparatus according to the present invention, it is preferable as one mode that the thread-like member has a color with which a difference between one piece of the numerical information and another piece of the numerical information is greater than or equal to a predetermined threshold in the portion corresponding to the thread-like member in the image data.

According to this configuration, it is possible to further improve the accuracy of specifying the portion corresponding to the thread-like member in the image data regardless of the lighting state at the installation location.

In the airflow detection apparatus according to the present invention, it is preferable as one mode that the airflow detection apparatus further includes a background plate whose image is captured as a background of the thread-like member when the image capture device captures an image of the thread-like member, and the thread-like member and the background plate have different colors from each other.

According to this configuration, the image data used in the calculation processing can be simplified, and the calculation processing for specifying the portion corresponding to the thread-like member in the image data can be simplified.

In the airflow detection apparatus according to the present invention, it is preferable as one mode that the image data includes at least two pieces of numerical information for each pixel, the thread-like member has a color with which a difference between one piece of the numerical information and another piece of the numerical information is greater than or equal to a predetermined threshold in the portion corresponding to the thread-like member in the image data, and the background plate has a color with which a difference between one piece of the numerical information and another piece of the numerical information is smaller than a predetermined threshold in a portion corresponding to the background plate in the image data.

According to this configuration, it is possible to improve the accuracy of specifying the portion corresponding to the thread-like member in the image data regardless of the lighting state at the installation location.

DETAILED DESCRIPTION OF THE PREFERRED ENBODIMENTS

First Embodiment

An embodiment of a first airflow detection apparatus, airflow detection method, and airflow detection program according to the present invention will be described with reference to the drawings. A description will be given below of an example in which the first airflow detection apparatus according to the present invention is applied to an airflow detection apparatus 1 that is provided to detect an airflow occurring inside a painting booth 100.

Configuration of Painting Booth

Figure 1:
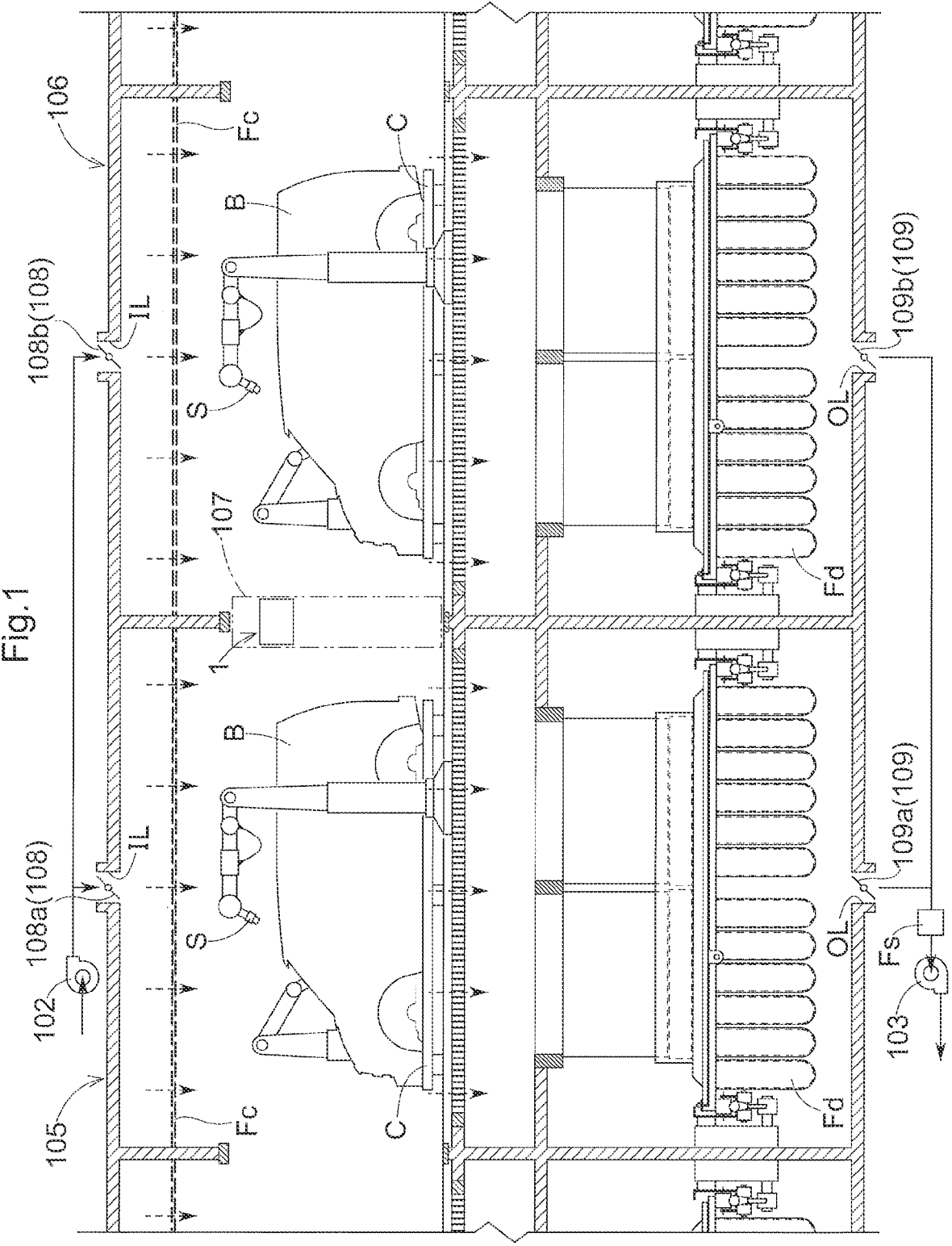
FIG. 1 is a side cross-sectional view of a painting booth according to a first embodiment.

First, a painting booth 100 according to the present embodiment will be described. The painting booth 100 is a tunnel-shaped painting booth in which spray painting is performed on bodies B of automobiles. The painting booth 100 has spray devices S for spraying paints onto each body B and conveyers C for conveying the body B, and sprays the paints onto the body B while conveying the body B along one axis (in a left-right direction on the paper plane of FIG. 1) using the conveyors C (FIG. 1). Note that the painting booth 100 has glass windows 101 (each of which is an example of a see-through portion) such that the inside of the painting booth 100 can be seen from the outside (FIG. 2).

The painting booth 100 according to the present embodiment is provided with inlet ports IL and outlet ports OL (FIG. 1). The inlet ports IL are provided at upper portions of the painting booth 100, and supplies temperature and humidity-controlled air blown from an air supply fan 102 into the painting booth 100. The air outlets OL are provided at lower portions of a floor surface of the painting booth 100, which is configured to be able to be ventilated, and air is suctioned by an air exhaust fan 103. An air supply damper 108 for adjusting the air supply flow rate is provided at each air inlet IL. Similarly, an air exhaust damper 109 for adjusting the air exhaust flow rate is provided at each air outlet OL. Excess paint scattered in the atmosphere in the painting booth 100 during a painting operation is captured by an airflow from an air inlet IL toward an air outlet OL, and is discharged from the air outlet OL to the outside of the painting booth 100.

Note that a ceiling filter Fc is provided at an upper portion of the painting booth 100 to remove dust from the air introduced from the air inlets IL. An exhaust dust removal equipment Fd is provided below the floor of the painting booth 100, and most of the paint captured by an airflow is collected by the exhaust dust removal equipment Fd. Furthermore, an exhaust secondary filter Fs is provided downstream of the air outlets OL, and paint that has not been collected by the exhaust dust removal equipment Fd is collected by the exhaust secondary filter Fs.

Figure 2:
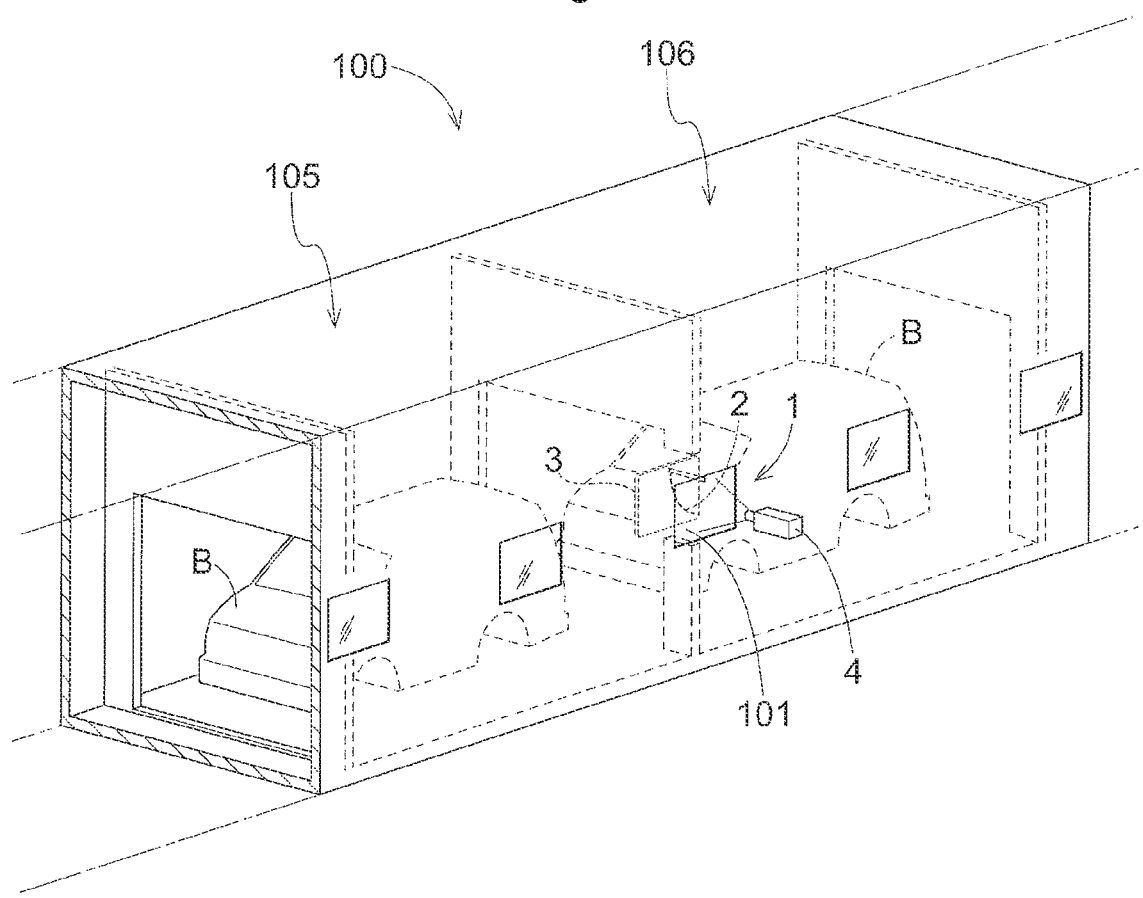
FIG. 2 is a perspective view of the painting booth according to the first embodiment.

The painting booth 100 according to the present embodiment is partitioned into a first section 105 and a second section 106 (FIGS. 1 and 2). Painting operations using paints of different colors are performed in the first section 105 and the second section 106. Here, if an airflow from one of the first section 105 and the second section 106 to the other one is present, a paint used on the upstream side of this airflow mixes into the downstream process. At this time, there may be cases where an unintended color is attached to a body B and a desired painted product cannot be obtained.

Figure 4:
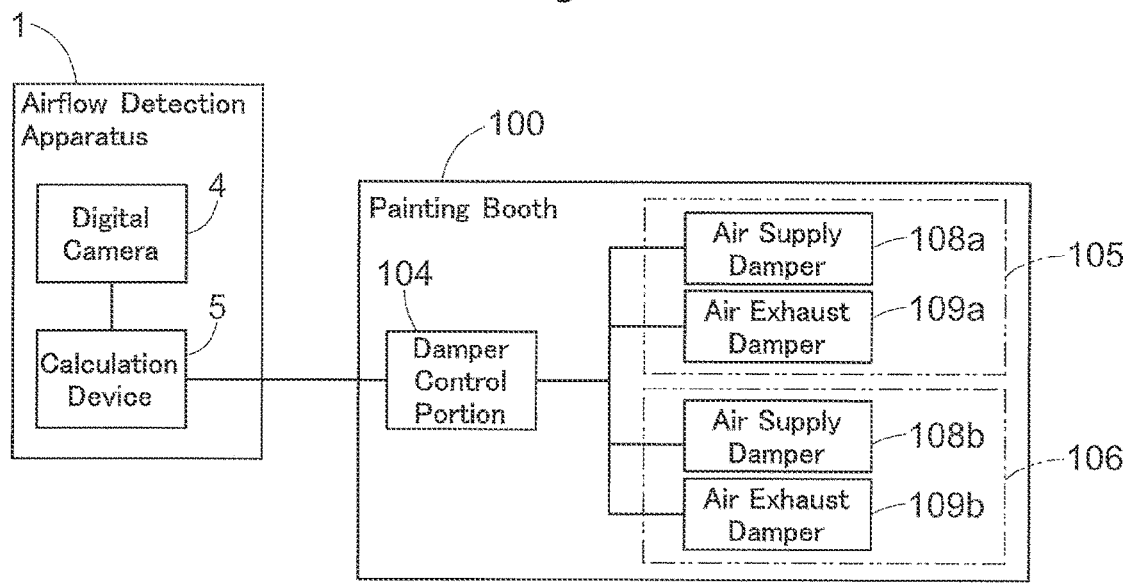
FIG. 4 is a block diagram of the painting booth and the airflow detection apparatus according to the first embodiment.

For this reason, a control is performed to equalize the air pressures in the first section 105 and the second section 106 as much as possible such that no airflow from one of the first section 105 and the second section 106 toward the other one occurs. Specifically, a damper control portion 104 (FIG. 4) for controlling the degree of opening of each damper is provided to control the degrees of opening of an air supply damper 108a and an air exhaust damper 109a of the first section 105 and an air supply damper 108b and an air exhaust damper 109b of the second section 106 such that the air pressures in the first section 105 and the second section 106 are equal. To enable such a control, the airflow detection apparatus 1 is provided at a boundary portion 107 between the first section 105 and the second section 106 (FIGS. 1 and 2).

Configuration of Airflow Detection Apparatus

Next, the airflow detection apparatus 1 according to the present embodiment will be described. The airflow detection apparatus includes a thread-like member 2 and a background plate 3 that are provided inside the painting booth 100, and a digital camera 4 (an example of an image capture device) and a calculation device 5 that are provided outside the painting booth 100 (FIGS. 1 to 4).

Figure 3:
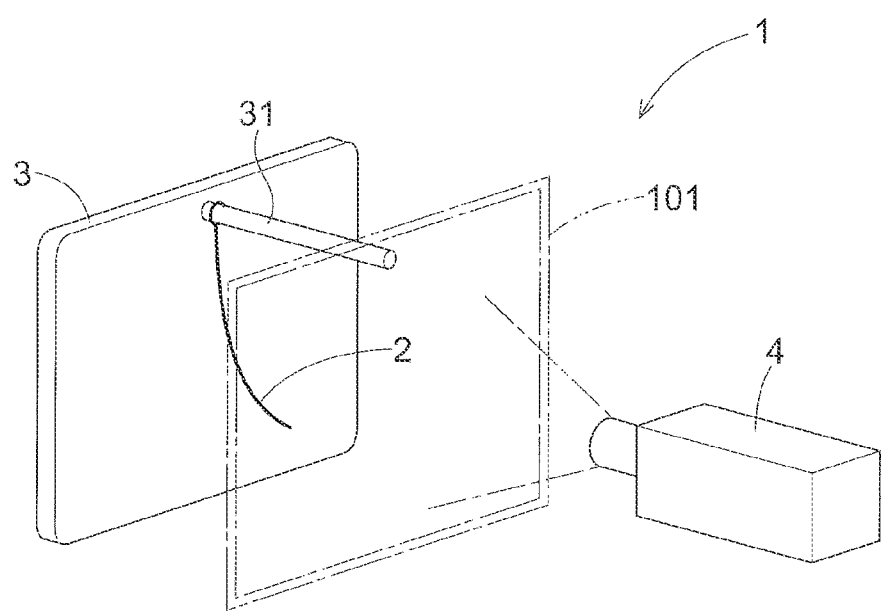
FIG. 3 is a schematic perspective view of an airflow detection apparatus according to the first embodiment.

The thread-like member 2 is provided in a suspended manner at the boundary portion 107 between the first section 105 and the second section 106 inside the painting booth 100 (FIG. 3). Note that the thread-like member 2 is colored red. Since the thread-like member 2 is sufficiently lightweight, if there is even a small airflow from one of the first section 105 and the second section 106 toward the other one, the thread-like member 2 swings due to this airflow.

The background plate 3 is fixed to the boundary portion 107 between the first section 105 and the second section 106 inside the painting booth 100, similarly to the thread-like member 2 (FIG. 3). More specifically, the background plate 3 is supported, together with the thread-like member 2, by a shaft member 31 that extends inward of the painting booth 100 from a corresponding window 101, and is disposed at a position at which the background plate 3 is seen farther on a distal side than the thread-like member 2 when the thread-like member 2 and the background plate 3 are seen through the window 101 provided at the boundary portion 107. That is to say, the background plate 3 is provided at a position farther from the window 101 than the thread-like member 2. Note that the background plate 3 is colored gray.

The digital camera 4 is fixed at a position that is outside the painting booth 100 and adjacent to the window 101 (FIG. 3). The digital camera 4 is installed such that a lens thereof faces toward the inside of the painting booth 100 through the window 101, and can capture an image of the thread-like member 2 and the background plate 3 through the window 101. Upon the digital camera 4 capturing an image of the thread-like member 2 and the background plate 3, image data P1 obtained by capturing the image of the thread-like member 2 with the background plate 3 as a background is generated. The digital camera 4 is configured to be able to communicate with the calculation device 5, and the image data P1 is transferred to the calculation device 5. Note that, in the present embodiment, color information on each pixel of the image data P1 is expressed by an 8-bit RGB value (0 to 255 in decimal) (an example of numerical information).

The calculation device 5 is a device that performs calculation processing on the image data P1 to detect an airflow, and is hardware that has a CPU as a core member. An airflow detection program according to the present invention is installed in the calculation device 5. The calculation device 5 is configured to be able to communicate with the digital camera 4, and receives the image data P1 of the thread-like member 2 (and the background plate 3) generated by the digital camera 4. The calculation device 5 is also configured to be able to communicate with the damper control portion 104, and sends the direction and the wind speed of the detected airflow to the damper control portion 104.

Airflow Detection Method

Next, an airflow detection method according to the present embodiment will be described. A description will be given below of an example of the case where the air pressure in the first section 105 is higher than the air pressure in the second section 106, and accordingly an airflow from the first section 105 toward the second section 106 is occurring, with reference to the image data P1 (FIG. 5) that is obtained in this case. Note that actual structures represented on the image data P1 are assigned the same reference numerals as those of the corresponding actual structures. Accordingly, for example, the thread-like member 2 represented on the image data P1 is assigned the reference numeral "2".

First, the calculation device 5 extracts an imaging area Q1 of the thread-like member 2 and the background plate 3 from the image data P1. Note that since both the background plate 3 and the digital camera 4 are fixed, the pixel area of the image data P1 that corresponds to the imaging area Q1 is substantially fixed.

Next, a difference C1(R–G) between an R value and a G value (an example of a difference between one piece of numerical information and another piece of numerical information) and a difference C2(R–B) between the R value and a B value (an example of a difference between one piece of numerical information and another piece of numerical information) are calculated for each pixel of the extracted portion. Here, in a portion corresponding to the thread-like member 2 in the image data P1, the values of C1 and C2 are sufficiently large positive values since the thread-like member 2 is colored red. Meanwhile, in a portion corresponding to the background plate 3 in the image data P1, the values of C1 and C2 are close to 0 because the background plate 3 is colored gray. Thus, in the present embodiment, for each pixel of the portion extracted from the image data P1, a portion with both C1 and C2 exceeding 20 (an example of a predetermined threshold) is specified as a portion corresponding to the thread-like member 2, and a portion with at least one of C1 and C2 being 20 or less is specified as a portion corresponding to the background plate 3.

Coordinates (X1, Y1) and coordinates (X2, Y2) are specified for the above-specified portion corresponding to the thread-like member 2, the coordinates (X1, Y1) corresponding to an upper end portion 21, which is an intersection of an upper boundary of the imaging area Q1 and the portion corresponding to the thread-like member 2 (an example of one end portion of the portion corresponding to the thread-like member), the coordinates (X2, Y2) corresponding to a lower end portion 22, which is an intersection of a lower boundary of the imaging area Q1 and the portion corresponding to the thread-like member 2 (an example of another end portion of the portion corresponding to the thread-like member). Here, on the image data P1, the angle θ is represented as an angle formed by a straight line connecting the upper end portion 21 to the lower end portion 22 and a vertical axis direction of the image data P1. Accordingly, the angle θ is given by the following equation (1).

$$\theta = \arctan((X2 - X1)/(Y2 - Y1)) \quad \text{Equation (1)}$$

Figure 5:
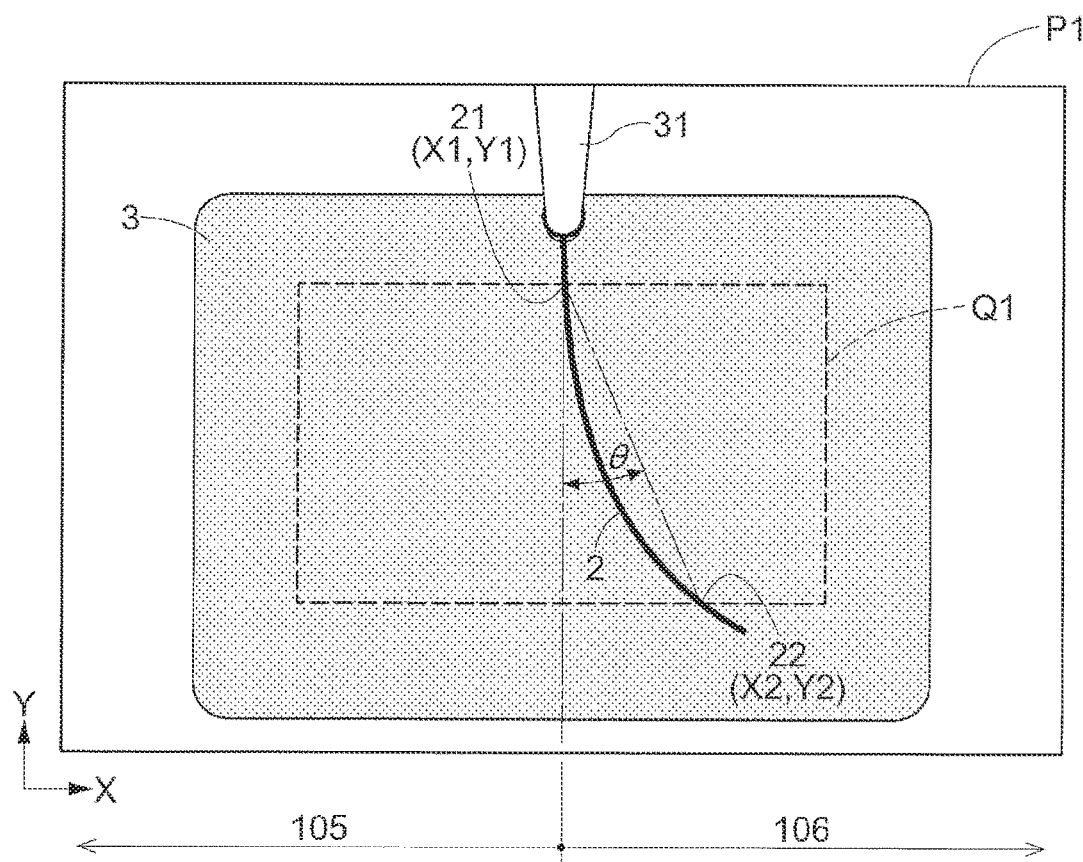
FIG. 5 shows an example of image data according to the first embodiment.

Here, since the upper end portion 21 is close to a supporting point at which the thread-like member 2 is supported, the coordinates (X1, Y1) corresponding to the upper end portion 21 hardly change even if the direction and the wind speed of an airflow change. In contrast, the coordinates (X2, Y2) of the lower end portion 22 change due to the direction and the wind speed of an airflow occurring at the boundary portion 107. More specifically, the higher the wind speed, the larger the absolute value of the angle θ, and thus, the wind speed can be estimated based on the angle θ. Further, the angle θ takes a positive value when an airflow from the first section 105 toward the second section 106 is occurring as shown in FIG. 5, and the angle θ takes a negative value when an airflow from the second section 106 toward the first section 105 contrary to the state shown in FIG. 5 is occurring, and thus, the direction of an airflow can be specified based on whether the angle θ is positive or negative.

In contrast, when there is almost no difference in air pressure between the first section 105 and the second section 106, and almost no airflow is occurring at the boundary portion 107, the thread-like member 2 is suspended substantially vertically from the supporting point, and therefore θ is close to 0. Accordingly, in order to not generate an airflow from one of the first section 105 and the second section 106 toward the other one, the degree of opening of each damper may be feedback-controlled that the angle θ is closer to 0. For example, when the angle θ takes a positive value, an airflow from the first section 105 toward the second section 106 is occurring, and thus, a control to reduce the air pressure in the first section 105 and/or increase the air pressure in the second section 106 needs to be performed. Accordingly, one or more controls selected from a group consisting of a control to reduce the degree of opening of the air supply damper 108a, a control to increase the degree of opening of the air exhaust damper 109a, a control to increase the degree of opening of the air supply damper 108b, and a control to reduce the degree of opening of the air exhaust damper 109b may be performed. Further, the larger the absolute value of θ, the higher the wind speed, that is, the larger the difference in air pressure between the first section 105 and the second section 106, and thus, the larger the change in the degree of opening of each damper to be made.

Note that since the air pressure in each part in the painting booth 100 is not necessarily fixed, the direction and the wind speed of airflows are constantly changing. Therefore, depending on the timing of acquiring the image data P1, the image data P1 that does not necessarily reflect the state of the inside of the painting booth 100 well may be obtained. In this case, if the degree of opening of each damper is controlled based on the angle θ derived from the image data P1, appropriate control is not performed.

In view of this, in the present embodiment, the image data P1 is generated by the digital camera 4 once per second (an example of a predetermined time interval). Then, a moving average for five seconds is obtained for the angle θ calculated based on the image data P1 that is generated every second. Then, an airflow is specified based on the moving average instead of the angle θ. By thus using the moving average instead of the angle θ at a certain moment, an airflow in the painting booth 100 can be detected more accurately.

Variation

The method for calculating the angle θ is not limited to the above method. For example, when the length of the thread-like member 2 is sufficiently long, and the angle θ is sufficiently small even if the wind speed is large, an approximate expression θ≈tan θ (where the angle θ is expressed in radians) holds, and accordingly, the angle θ can be calculated with the following equation (2), which is simplified from the above equation (1).

$$\theta=(X2-X1)/(Y2-Y1) \qquad \text{Equation (2)}$$

Further, the angle θ does not necessarily need to be calculated. As mentioned above, substantially only the coordinates (X2, Y2) corresponding to the lower end portion 22 change in accordance with the direction and the wind speed of an airflow. Further, Y1 and Y2 are constant because they coincide with the Y coordinates of the upper and lower boundaries of the imaging area Q1, respectively. That is to say, the angle θ is substantially a function of (X2−X1) regardless of whether the equation (1) or (2) is applied. Therefore, if the correlation relationship between the direction and the wind speed of an airflow and (X2−X1) is clarified in advance, the direction and the wind speed of an airflow can be determined based on the value of (X2−X1). Note that if the upper boundary of the imaging area Q1 is made as close as possible to the position of the shaft member 31, X1 can further be regarded as a constant, and the direction and the wind speed of an airflow can be determined based on the value of X2.

Note that the length of the thread-like member 2 is not specifically limited, but it is preferable that the length of the thread-like member 2 is selected such that a proportional relationship is established, at least approximately, between the angle θ and the wind speed of an airflow. Specifically, if the thread-like member 2 is excessively short, there is concern that a proportional relationship may not be established between the angle θ and the wind speed of an airflow.

Second Embodiment

An embodiment of a second airflow detection apparatus, airflow detection method, and airflow detection program according to the present invention will be described with reference to the drawings. A description will be given below of an example in which the second airflow detection apparatus according to the present invention is applied to an airflow detection apparatus 6 that is provided to detect an airflow occurring inside the painting booth 100. Note that the same reference numerals are assigned to the same configurations as those of the first embodiment, and a description thereof is omitted or simplified.

Configuration of Painting Booth

The configuration of the painting booth 100 itself that is subjected to airflow detection in the present embodiment is the same as that of the first embodiment. However, the airflow detection apparatus 1 is provided at the boundary portion 107 in the first embodiment, whereas the airflow detection apparatus 6 is provided at the boundary portion 107 in the present embodiment.

Configuration of Airflow Detection Apparatus

Figure 6:
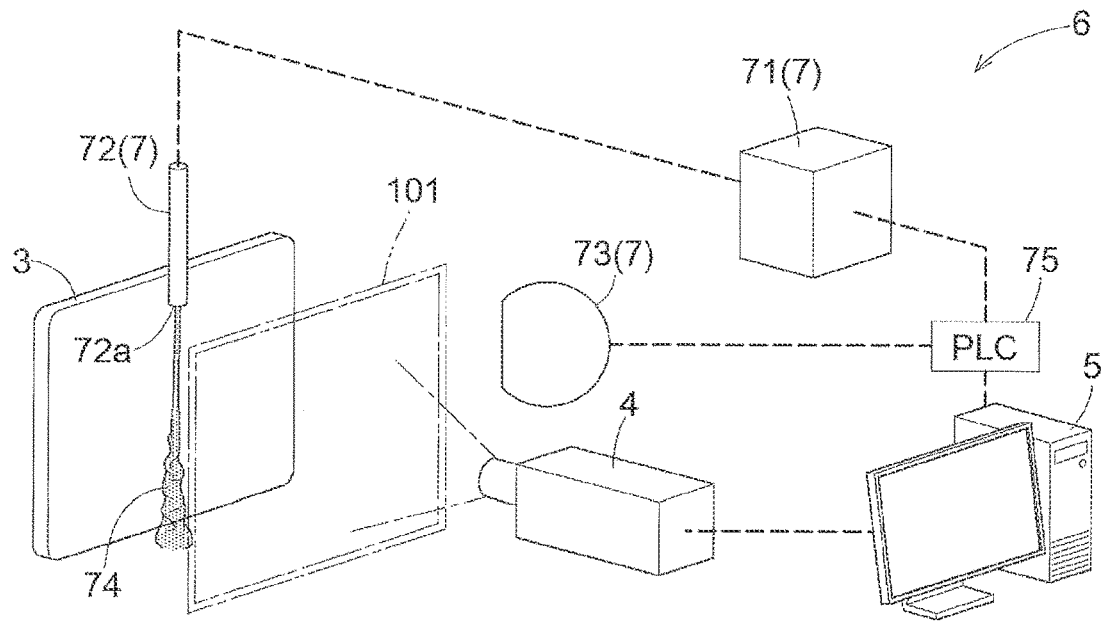
FIG. 6 is a schematic perspective view of an airflow detection apparatus according to a second embodiment.
Figure 7:
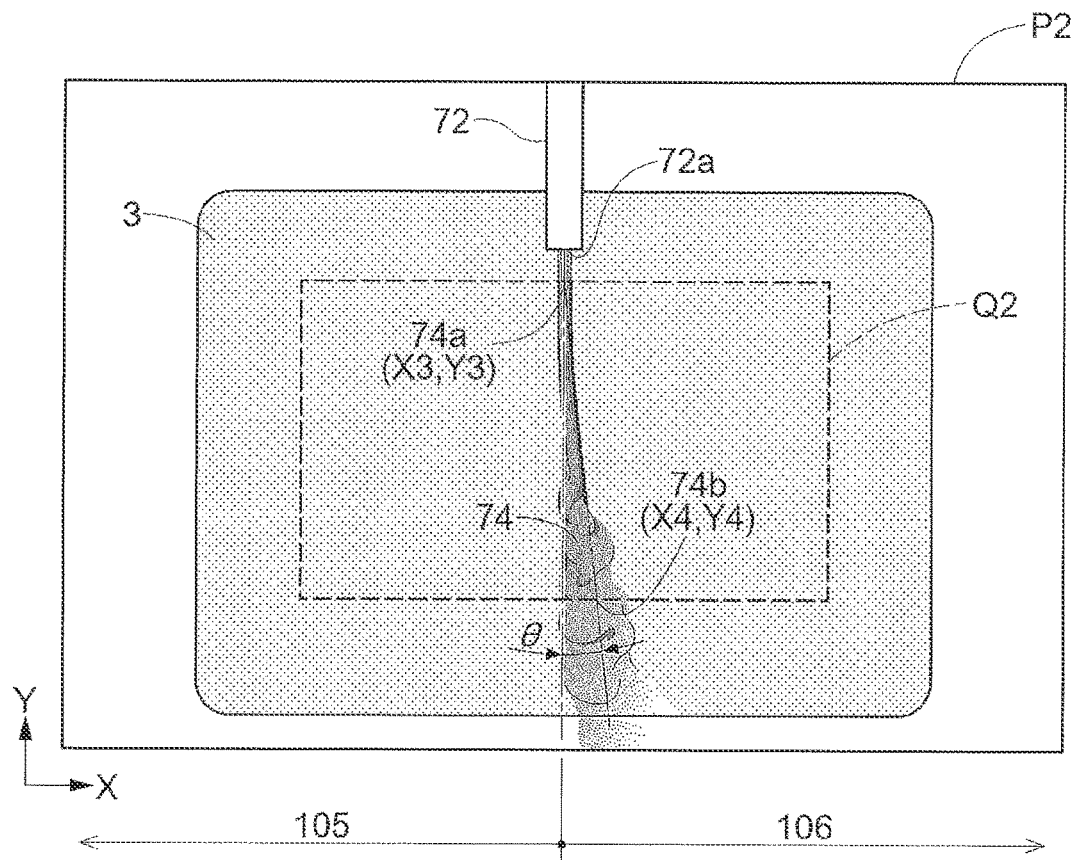
FIG. 7 shows an example of image data according to the second embodiment.

The airflow detection apparatus 6 according to the present embodiment includes a discharge device 7, the background plate 3, the digital camera 4 (an example of an image capture device), and the calculation device 5 (FIGS. 6 and 7). A difference from the first embodiment in terms of hardware lies in that the discharge device 7 is provided instead of the thread-like member 2. The background plate 3, the digital camera 4, and the calculation device 5 are installed at the same locations as in the first embodiment, that is, the background plate 3 is provided inside the painting booth 100, and the digital camera 4 and the calculation device 5 are provided outside the painting booth 100.

The discharge device 7 has a fluid generation device 71, a nozzle 72, and a lighting unit 73 (FIG. 6). Here, the fluid generation device 71 and the lighting unit 73 are provided outside the painting booth 100, and the nozzle 72 is provided inside the painting booth 100.

The fluid generation device 71 according to the present embodiment is a device capable of generating a fluid 74. More specifically, the fluid 74 is an atomized fluid in a mode of fine water droplets conveyed by air, which appears white in the air, and thus the presence thereof can be detected by an optical method. However, the fluid 74 is not materially limited insofar as the presence thereof can be detected by an optical method in at least a portion of the imaging area of the digital camera 4, and the configuration of the fluid generation device 71 may be selected as appropriate in correspondence with the selection of the fluid 74.

Two typical modes of the fluid 74 are described as examples; namely, a mode in which liquid or solid fine particles are conveyed by a medium such as air, and a mode in which a substance is generated that physically or chemically changes after being discharged from the nozzle 72 and can then be detected by an optical method. The fine particles in the former mode may be not only the aforementioned water droplets but also droplets of glycols (propylene glycol, tripropylene glycol, and 1, 3-butylene glycol etc.), or solid powder of titanium tetrachlorinated or the like. However, water droplets are preferably used since water droplets can be readily supplied and hardly contaminates the painting booth 100. The medium may be not only the aforementioned air but also nitrogen, carbon dioxide, or the like.

As the latter mode of the fluid 74, a fluid that contains supersaturated water vapor is an example. A fluid that contains supersaturated water vapor is transparent when discharged from the nozzle 72 and cannot be detected by an optical method. However, after the fluid is discharged into the painting booth 100, the water vapor contained in the fluid partially aggregates to form droplets, which can then be detected by an optical method. As in this mode, the fluid 74 does not need to be one that can be detected by an optical method when discharged from the nozzle 72, and the presence of the fluid 74 need only be able to be detected by an optical method in at least a portion of the imaging area of the digital camera 4.

The nozzle 72 is in fluid communication with the fluid generation device 71, and the fluid 74 can be discharged from a leading end 72a of the nozzle 72. The nozzle 72 is provided at the boundary portion 107 inside the painting booth 100 in an arrangement in which the leading end 72a faces downward (FIG. 6), and accordingly the discharge device 7 can discharge the fluid 74 downward. Here, if there is even a small airflow from one of the first section 105 and the second section 106 toward the other one, the fluid 74 is caused to flow from the upstream side toward the downstream side of the airflow.

The lighting unit 73 is provided so as to be able to irradiate the nozzle 72 and the background plate 3 with light. Since the lighting unit 73 is provided outside the painting booth 100, the nozzle 72 and the background plate 3 are irradiated with the light of the lighting unit 73 through the corresponding window 101. When the fluid 74 discharged from the nozzle 72 is irradiated with light, the fluid 74 can be clearly seen due to the Tyndall phenomenon.

Starting and stopping of the fluid generation device 71 and the lighting unit 73 is controlled by a PLC 75. The PLC 75 is electrically connected to the calculation device 5 and operates in accordance with a control signal from the calculation device 5. With this configuration, for example, a control can be carried out so as to start the fluid generation device 71 and the lighting unit 73 only when an airflow is detected using the airflow detection apparatus 6.

The configuration and the installation location of the background plate 3 itself are the same as those of the first embodiment. However, whereas, in the first embodiment, the shaft member 31 is provided in the first embodiment in a mode of penetrating the background plate 3 and extending toward the window 101 side, no portion that extends from the background plate 3 toward the window 101 side is provided (FIG. 6). Note that the background plate 3 is provided at a position farther from the window 101 than the nozzle 72. The background plate 3 is colored gray similarly to the first embodiment.

The digital camera 4 and the calculation device 5 are the same, in terms of hardware, as those described in the first embodiment. However, the subject whose image is to be captured by the digital camera 4 is the nozzle 72, the fluid 74, and the background plate 3, in place of the thread-like member 2 and the background plate 3 in the first embodiment. Accordingly, the digital camera 4 can generate image data P2 (8-bit RGB) obtained by capturing an image of the nozzle 72 and the fluid 74 with the background plate 3 as a background (FIG. 7). The calculation device 5 performs calculation processing based on the image data P2 captured by the digital camera 4.

Airflow Detection Method

Next, an airflow detection method according to the present embodiment will be described. A description will be given below of an example of the case where the air pressure in the first section 105 is higher than the air pressure in the second section 106, and accordingly an airflow from the first section 105 toward the second section 106 is occurring, with reference to the image data P2 (FIG. 7) that is obtained in this case. Note that actual objects represented on the image data P2 are assigned the same reference numerals as those of the corresponding actual objects.

First, the calculation device 5 specifies a portion corresponding to the fluid 74 and a portion corresponding to the background plate 3 in the image data P2. The method for this specification is the same as the method for specifying the portions corresponding to the thread-like member 2 and the background plate 3 in the first embodiment. Since the fluid 74 diffuses from the leading end 72*a* of the nozzle 72, the portion corresponding to the fluid 74 in the image data P2 has a two-dimensional spread.

Subsequently, for the above-specified portion corresponding to the fluid 74, the coordinates of intersections of an upper boundary of an imaging area Q2 and the portion corresponding to the fluid 74 and the coordinates of intersections of a lower boundary of the imaging area Q2 and the portion corresponding to the fluid 74 are specified. Since the portion corresponding to the fluid 74 has a two-dimensional spread as mentioned above, there are two intersections on each of the upper side and the lower side of the imaging area Q2. It is assumed, as shown in FIG. 7, that a midpoint of the two intersections on the upper side of the imaging area Q2 is denoted as 74*a*(X3, Y3), and the midpoint of the two intersections on the lower side of the imaging area Q2 is denoted as 74*b*(X4, Y4).

The same analysis as that of the first embodiment can be carried out by specifying the two points 74*a*(X3, Y3) and 74*b*(X4, Y4) as above. Note that the specification of the direction and the wind speed of an airflow based on the angle θ and the feedback control of the degree of opening of each damper are the same as those of the first embodiment, and therefore a description thereof is omitted here.

Variation

The variation described regarding the first embodiment is also applicable to the present embodiment.

In addition, instead of calculating the angle θ, the direction and the wind speed of an airflow may be calculated based on the shape of the portion corresponding to the fluid 74 in the image data P2. For example, the imaging area Q2 is divided into left and right regions, and the direction of an airflow can be determined based on whether a point farther from the center of the imaging area Q2, of the intersections of the lower boundary of the imaging area Q2 and the portion corresponding to the fluid 74, is present in the above-divided left or right region. Further, since the area of the portion corresponding to the fluid 74 has a positive correlation relationship with the wind speed, the wind speed can be specified by using this.

Other Embodiments

Lastly, other embodiments of the airflow detection apparatus, the airflow detection method, and the airflow detection program according to the present invention will be described. Note that the configuration disclosed in each of the following embodiments can also be combined with the configurations disclosed in the other embodiments as long as no contradiction arises.

The above embodiments have described, as an example, a configuration in which each of the airflow detection apparatuses 1 and 6 are provided at the boundary portion 107 between the first section 105 and the second section 106 in the painting booth 100. However, the present invention is not limited to this configuration, and the airflow detection apparatus according to the present invention may be installed at any location at which an airflow is to be detected. For example, if the airflow detection apparatus according to the present invention is installed at an entrance/exit of the painting booth, an unfavorable airflow that enters and exits from the painting booth (e.g., an airflow that contains dust flowing from the outside to the inside of the painting booth) can be detected.

The above embodiments have described, as an example, a configuration in which each of the airflow detection apparatuses 1 and 6 are provided in the painting booth 100 that is partitioned into the first section 105 and the second section 106. However, the present invention is not limited to this configuration. The airflow detection apparatus according to the present invention may also be installed in a painting booth the inside of which is not partitioned, or may be installed in a painting booth the inside of which is partitioned into three or more sections.

The above embodiments have described, as an example, a configuration in which the digital camera 4 is installed outside the painting booth 100. However, the image capture device according to the present invention may alternatively be installed inside the painting booth. However, if the image capture device according to the present invention is installed outside the painting booth, there are advantages that, for example, the image capture device is less likely to be stained with a paint, and the image capture device does not need to be an explosion-proof device even if devices installed in the painting booth are required to be explosion-proof.

The above embodiments have described, as an example, a configuration in which color information on each pixel of the image data P1 is expressed by an 8-bit RGB value, that is, by the RGB color system. However, the present invention is not limited to this configuration. In the airflow detection apparatus according to the present invention, color information on each pixel of the image data may be expressed by any color system. Accordingly, color information on each pixel of the image data according to the present invention may be expressed by, for example, the CMY color system, the CMYK color system, the Lab color system, the L*a*b* color system, or a grayscale. In the case of using any color system, any gradation may be employed, and for example, 8-bit, 16-bits, 24-bit, or 32-bit gradation may be employed. Note that, in the present invention, calculation processing for specifying the portion corresponding to the thread-like member in the image data may be performed based on numerical information in the color system selected for each pixel.

The above embodiments have described, as an example, a configuration in which color information on each pixel of the image data P1 is expressed by an 8-bit RGB value, that is, the image data P1 includes three pieces of numerical information, namely an R value, a G value, and a B value for each pixel. However, the present invention is not limited to this configuration, and the image data according to the present invention may include one, two, or four or more pieces of numerical information for each pixel. However, if two or more pieces of numerical information are included for each pixel, the accuracy of the calculation processing for specifying the portion corresponding to the thread-like member can be readily increased.

The above embodiments have described, as an example, a configuration in which the thread-like member 2 is colored red. However, the present invention is not limited to this configuration, and the color of the thread-like member of the airflow detection apparatus according to the present invention is not specifically limited. However, it is preferable that the thread-like member according to the present invention is colored with a color that can be readily distinguished from other colors in the color system used in the image data. For example, if, as in the above example, the RGB color system is used in the image data and the thread-like member is colored red, green, or blue, only one of the R value, the G value, and the B value is prominently large in the portion corresponding to the thread-like member in the image data, and thus, the portion corresponding to the thread-like member in the image data can be readily specified.

The above embodiments have described, as an example, a configuration in which each of the airflow detection apparatuses 1 and 6 include the background plate 3. However, the present invention is not limited to this configuration, and the airflow detection apparatus according to the present invention does not need to include the background plate. However, if the airflow detection apparatus according to the present invention includes the background plate, the portion corresponding to the thread-like member or the fluid in the image data can be readily specified.

The above embodiments have described, as an example, a configuration in which the background plate 3 is colored gray. However, the present invention is not limited to this configuration, and the color of the background plate according to the present invention is not specifically limited. However, if, in the present invention, the colors of the background plate and the thread-like member or the fluid satisfy a condition that, for example, the colors differ from each other, or that a contrast difference is large, the portion corresponding to the thread-like member or the fluid in the image data can be readily specified, which is preferable.

The above embodiments have described an example in which the nozzle 72 is provided in an arrangement in which the leading end 72a thereof faces downward, and the discharge device 7 is configured to be able to discharge the fluid 74 downward. However, the discharge device may alternatively discharge the fluid upward. Also, the terms "upward" and "downward" mentioned here should not be construed as being limited to directions parallel to the vertical direction. That is to say, an airflow to be detected may occur in the left-right direction (which should not be construed as being limited to the horizontal direction either), and the discharge device need only be able to discharge an fluid in a direction intersecting the airflow. The direction in which the discharge device discharges the fluid may be, for example, a direction in the range in which the absolute value of the angle formed with the vertical direction is 10° or less.

The above embodiments have described, as an example, a configuration in which the windows 101 are made of glass. However, the present invention is not limited to this configuration. If a painting booth in which the airflow detection apparatus according to the present invention is installed has a see-through portion, the material thereof may be not only glass but also a transparent resin such as polycarbonate or polymethacrylate. Note that, in the present invention, it is preferable that the see-through portion is colorless and transparent.

The above embodiments have described, as an example, a configuration in which an airflow is detected based on the angle θ in the image data P1 or P2. However, in the airflow detection apparatus according to the present invention, the method for detecting an airflow detection apparatus based on specification of the portion corresponding to the thread-like member in the image data is not specifically limited. For example, a classifier for detecting an airflow using the image data may be constructed by means of machine learning based on the generated image data, or an analysis algorithm such as Hough transform or an LSD (Line Segment Detector) may be used.

The above embodiments have described, as an example, a configuration in which an airflow is detected based on a moving average of the angle θ. However, the present invention is not limited to this configuration. In the airflow detection apparatus according to the present invention, an airflow may be detected based on momentary image data.

The above embodiments have described, as an example, a configuration in which the degree of opening of each damper is feedback-controlled such that the angle θ is closer to 0. However, the present invention is not limited to this configuration, and the airflow detection apparatus according to the present invention does not necessarily need to have a control function for the painting booth. In this case, an operator may artificially adjust the degree of opening of each damper based on information related to an airflow detected by the airflow detection apparatus. Further, the airflow detection device according to the present invention may employ, for example, a configuration in which only some of the dampers (e.g., only the air supply damper) can be controlled, a configuration in which the degree of opening of a flow rate control valve provided in a supply/exhaust path can be controlled, or a configuration in which the output of a supply/exhaust power device such as the air supply fan and the air exhaust fan can be controlled.

As for other configurations as well, the embodiments disclosed in the present specification are examples in all respects, and it should be understood that the scope of the present invention is not limited thereby. A person skilled in the art would readily understand that the embodiments can be modified as appropriate without departing from the gist of the present invention. Accordingly, other embodiments in which the above-disclosed embodiments are modified without departing from the gist of the present invention is naturally included in the scope of the present invention.

INDUSTRIAL APPLICABILITY

The present invention can be used, for example, to detect an airflow between different sections in a painting booth that is partitioned into a plurality of sections.

DESCRIPTION OF REFERENCE SIGNS

1: Airflow detection apparatus (first embodiment)
2: Thread-like member
21: Upper end portion
22: Lower end portion
3: Background plate
31: Shaft member
4: Digital camera
5: Calculation device
6: Airflow detection apparatus (second embodiment)
7: Discharge device
71: Fluid generation device
72: Nozzle
73: Lighting unit
74: Fluid
75: PLC
P: Image data
Q: Imaging area
θ: Angle
100: Painting booth
101: Window of painting booth
102: Air supply fan
103: Air exhaust fan
104: Damper control portion
105: First section of painting booth
106: Second section of painting booth
107: Boundary portion between first section and second section
108: Air supply damper
109: Air exhaust damper
IL: Air inlet
OL: Air outlet
S: Spray device
C: Conveyor
Fc: Ceiling filter
Fd: Exhaust dust removal equipment
Fs: Exhaust secondary filter
B: Body

The invention claimed is:

1. An airflow detection apparatus that detects an airflow in a painting booth, the apparatus comprising:
the painting booth;
a thread-like member placed inside the painting booth;
a see-through portion placed on the painting booth;
an image capture device placed outside of the painting booth and capable of generating image data obtained by capturing an image of the thread-like member through the see-through portion; and
a calculation device capable of performing calculation processing on the image data,
wherein the calculation device specifies a portion corresponding to the thread-like member in the image data, and detects the airflow based on a position of the portion.

2. The airflow detection apparatus according to claim 1, wherein the calculation device specifies one end portion and another end portion of the portion corresponding to the thread-like member in the image data, and detects the airflow based on an angle formed by a straight line connecting the one end portion and the other end portion and a vertical axis direction of the image data.

3. The airflow detection apparatus according to claim 2, wherein the image capture device generates the image data at a predetermined time interval, and
wherein the calculation device detects the airflow based on a moving average of the angle with respect to time that is calculated based on the image data generated at the predetermined time interval.

4. The airflow detection apparatus according to claim 3, wherein the calculation device specifies the portion corresponding to the thread-like member in the image data based on numerical information regarding at least some pixels of the image data.

5. The airflow detection apparatus according to claim 2, wherein the calculation device specifies the portion corresponding to the thread-like member in the image data based on numerical information regarding at least some pixels of the image data.

6. The airflow detection apparatus according to claim 1, wherein the calculation device specifies the portion corresponding to the thread-like member in the image data based on numerical information regarding at least some pixels of the image data.

7. The airflow detection apparatus according to claim 6, wherein the image data includes at least two pieces of numerical information for each pixel, and
wherein the calculation device specifies the portion corresponding to the thread-like member in the image data based on a difference between one piece of the numerical information and another piece of the numerical information regarding the at least some pixels of the image data.

8. The airflow detection apparatus according to claim 7, wherein the thread-like member has a color with which a difference between one piece of the numerical information and another piece of the numerical information is greater than or equal to a predetermined threshold in the portion corresponding to the thread-like member in the image data.

9. The airflow detection apparatus according to claim 6, wherein the thread-like member has a color with which a difference between one piece of the numerical information and another piece of the numerical information is greater than or equal to a predetermined threshold in the portion corresponding to the thread-like member in the image data.

10. The airflow detection apparatus according to claim 1, further comprising:
a background plate whose image is captured as a background of the thread-like member when the image capture device captures an image of the thread-like member, wherein the color of the background plate is different from the color of the thread-like member.

11. The airflow detection apparatus according to claim 10, wherein, the image data includes at least two pieces of numerical information for each pixel,
wherein the thread-like member has a color with which a difference between one piece of the numerical information and another piece of the numerical information is greater than or equal to a predetermined threshold in the portion corresponding to the thread-like member in the image data, and
wherein the background plate has a color with which a difference between one piece of the numerical information and another piece of the numerical information is smaller than a predetermined threshold in a portion corresponding to the background plate in the image data.

12. An airflow detection method for detecting an airflow in an apparatus having a painting booth, a thread-like member placed inside the painting booth, a see-through portion placed on the painting booth, and an image capture device placed outside of the painting booth, the airflow detection method comprising:
   generating image data obtained by the image capture device by capturing through the see-through portion, an image of the thread-like member;
   performing calculation processing on the image data using a calculation device, and specifying a portion corresponding to the thread-like member in the image data; and
   detecting the airflow based on a position of the portion.

* * * * *